United States Patent
Taylor

(10) Patent No.: US 8,193,446 B1
(45) Date of Patent: Jun. 5, 2012

(54) WALL MOUNT ELECTRICAL BOX

(76) Inventor: Michael J. Taylor, South Bend, IN (US)

(*) Notice: Subject to any disclaimer, the term of this patent is extended or adjusted under 35 U.S.C. 154(b) by 200 days.

(21) Appl. No.: 12/545,352

(22) Filed: Aug. 21, 2009

(51) Int. Cl.
*H01R 13/46* (2006.01)

(52) U.S. Cl. .............. 174/58; 174/50; 174/64; 439/535; 248/906

(58) Field of Classification Search .............. 174/58, 174/50, 59, 60, 61, 64; 220/4.02; 248/906, 248/300, 343; 52/317
See application file for complete search history.

(56) References Cited

U.S. PATENT DOCUMENTS

| | | | |
|---|---|---|---|
| 3,620,404 A * | 11/1971 | Grasso | 220/477 |
| D406,070 S | 2/1999 | Thomas | |
| 5,998,746 A | 12/1999 | Clark | |
| 6,969,800 B1 * | 11/2005 | Liao | 174/50 |
| 7,105,742 B1 * | 9/2006 | Jolly | 174/50 |
| 7,173,184 B2 * | 2/2007 | Hull et al. | 174/58 |
| 7,238,882 B2 | 7/2007 | Perkins et al. | |
| 7,405,374 B2 | 7/2008 | Thomas et al. | |

* cited by examiner

*Primary Examiner* — Dhiru R Patel
(74) *Attorney, Agent, or Firm* — Botkin & Hall, LLP

(57) ABSTRACT

An electrical box mountable within a wall and installable from outside the wall. The box has a pan that includes a front flange for contacting an outer wall surface that extends outwardly from a sidewall. A back bracket is positioned opposite the front flange and adjacent to the back wall and a fastener having a shaft extends through the back wall to movably secure the back bracket to the back wall. No portion of the shaft extends behind the back bracket. The back bracket is movable relative to the pan between a first position adjacent to the back wall and a second position spaced farther from the back wall. The bracket and front flange are adapted for clamping a portion of a wall located between the front flange and back bracket when the back bracket is in its first position.

7 Claims, 5 Drawing Sheets

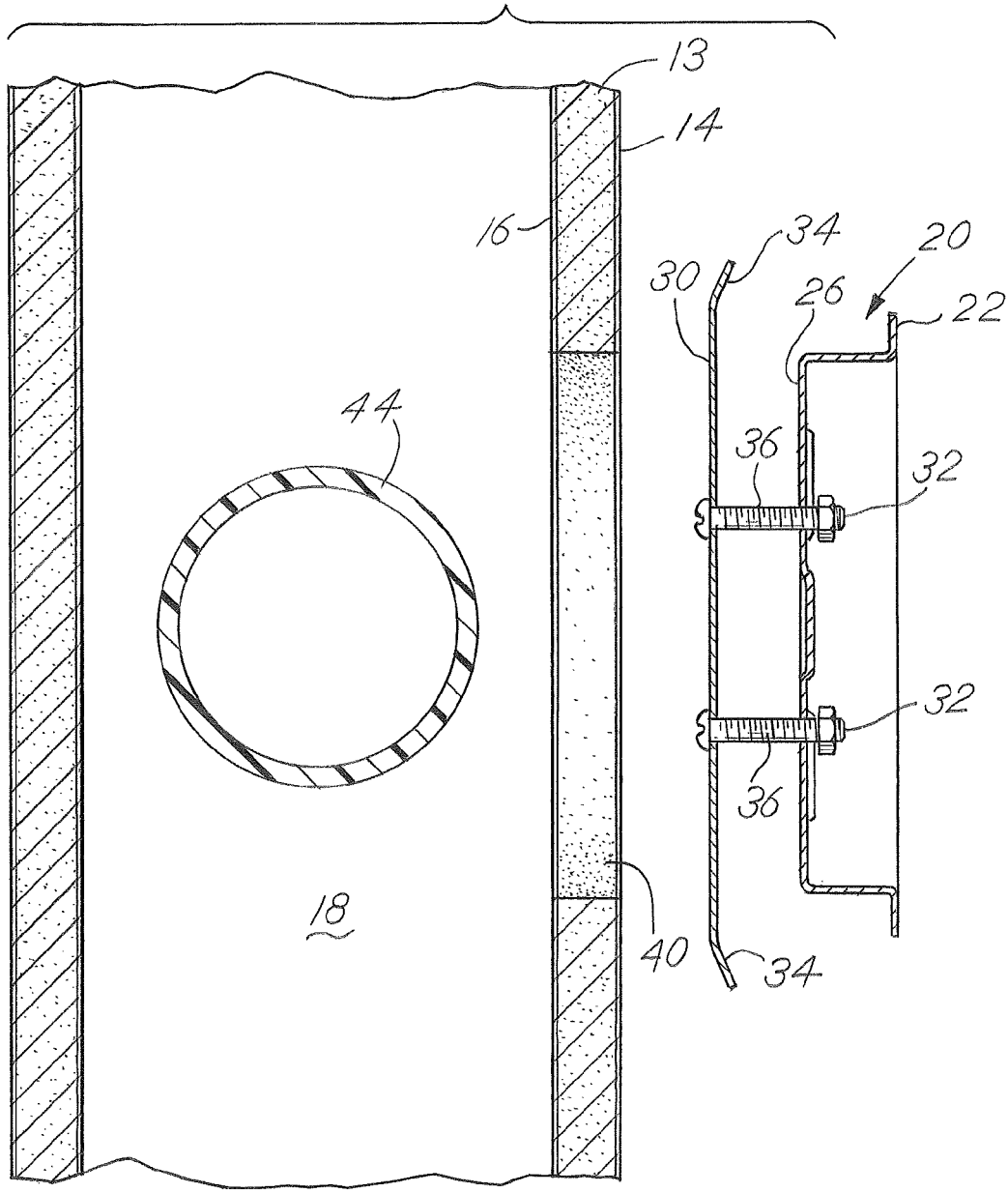

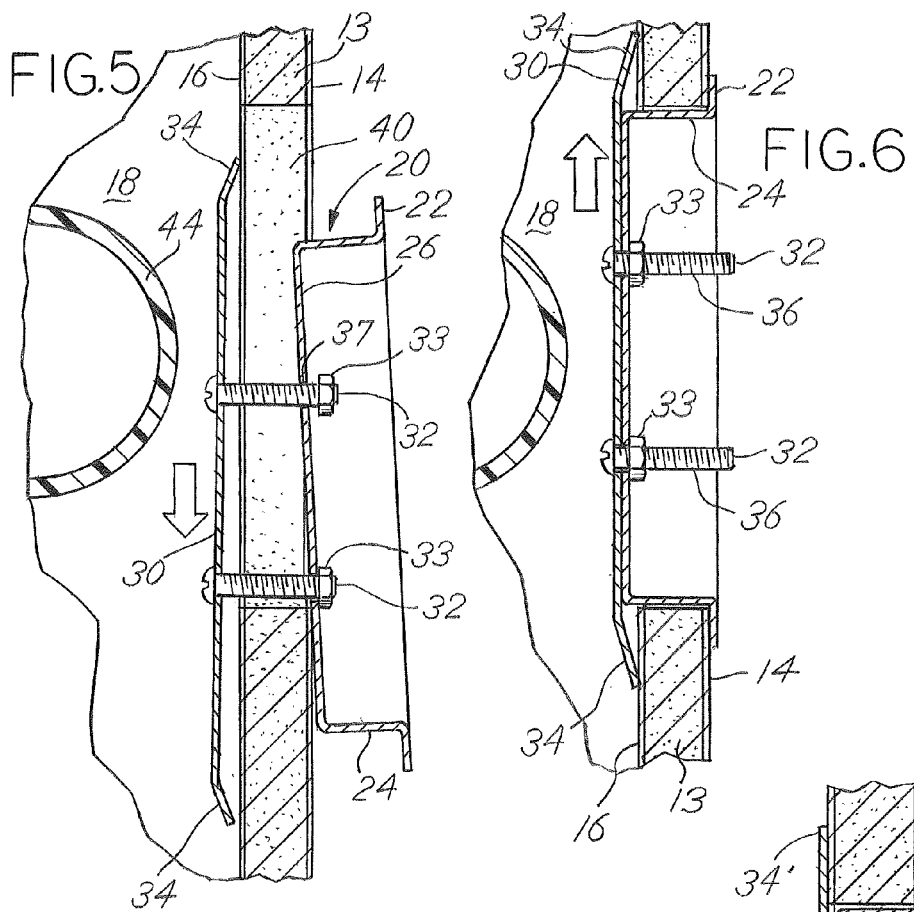
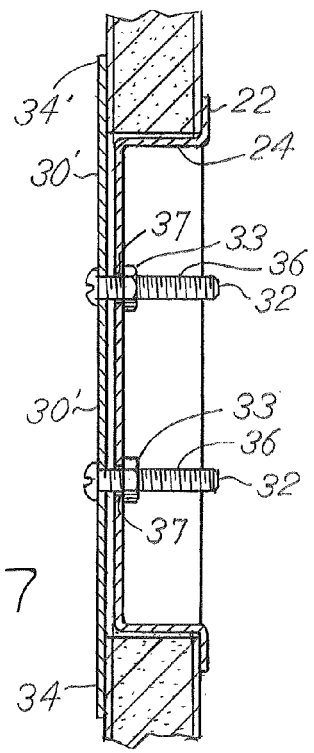

WALL MOUNT ELECTRICAL BOX

BACKGROUND OF THE INVENTION

Connections made within walls must be made within electrical junction boxes and the space within a wall is frequently an obstacle in installing a standard electrical box. Electrical boxes must be used to make electrical connections even when mechanical features within the wall make using the box inconvenient. Such mechanical features may include ductwork or plumbing pipes. Often times an electrician installing an electrical box does not have an opportunity to provide input as to the location of such mechanical features and must work around them. In such situations where an electrician works on a job after finish contractors have installed wallboard or other wall covering material, the electrician must work within the confines of the situation he finds. In cases where plumbing or ductwork is behind the location where an electrical fixture is desired to be placed, moving the location of the electrical box to another location may not be an option.

Shallow electrical boxes exist for challenging installations that require working in locations where mechanical obstructions prevent installing an electrical box extending deep within a wall. Typically, existing electrical boxes have threaded fasteners such as screws that protrude into the wall and a screwdriver is used to turn heads located on the outwardly facing side of the box. Turning the screws usually causes tabs to extend outwardly to clamp the wall from behind, or some toggle part within the wall is used to attach the box to the wall. If such a box were to be removed, it would not be possible to retrieve the tabs or toggle parts within the wall because these parts will fall to the bottom of the wall as the screws are removed. Additionally, the screws in existing boxes usually extend behind the deepest part of the box within the wall. While an existing electrical box may be shallow, the attaching screws may extend into the wall much deeper, thus creating the potential to damage mechanical features within the wall.

SUMMARY OF THE INVENTION

The present invention is an electrical box that is mountable within a wall and may be installed from outside the wall. The electrical box has a pan that includes a front flange for contacting an outer wall surface that extends outwardly from a sidewall. A back wall spans across the sidewall to define an interior. A back bracket is positioned opposite the front flange and adjacent to the back wall and a fastener having a shaft extends through the back wall to movably secure the back bracket to the back wall. No portion of the shaft extends behind the back bracket. The back bracket is movable relative to the pan between a first position adjacent to the back wall and a second position spaced farther from the back wall. The bracket and front flange are adapted for clamping a portion of a wall located between the front flange and back bracket when the back bracket is in its first position.

In another aspect of the invention the fastener includes threads on its shaft for receiving a nut, and the nut urges the back bracket against the portion of the wall between the front flange and back bracket as the nut is tightened against the back wall.

In the case where a plurality of fasteners are used, the fasteners are spaced from the sidewall to permit an end of the back bracket outside of the wall to be inserted into an opening in the wall that is substantially the same size as the exterior of the sidewall when the wall is located between the back wall and the back bracket.

When the fasteners are screws, the heads of the screws are the only portion of the fastener that extends behind the back bracket.

BRIEF DESCRIPTION OF THE DRAWINGS

FIG. 4 is a top sectional view of the electrical box shown in FIGS. 1-3 showing the electrical box outside the wall;

FIG. 5 is a top sectional view of the electrical box shown in FIGS. 1-4 with the wall between the back wall of the pan and back bracket;

FIG. 6 is a top sectional view of the electrical box shown in FIGS. 1-5 with the box installed in the wall; and FIG. 7 is another embodiment of the electrical box having a flat back bracket.

DETAILED DESCRIPTION OF INVENTION

Figure 1:
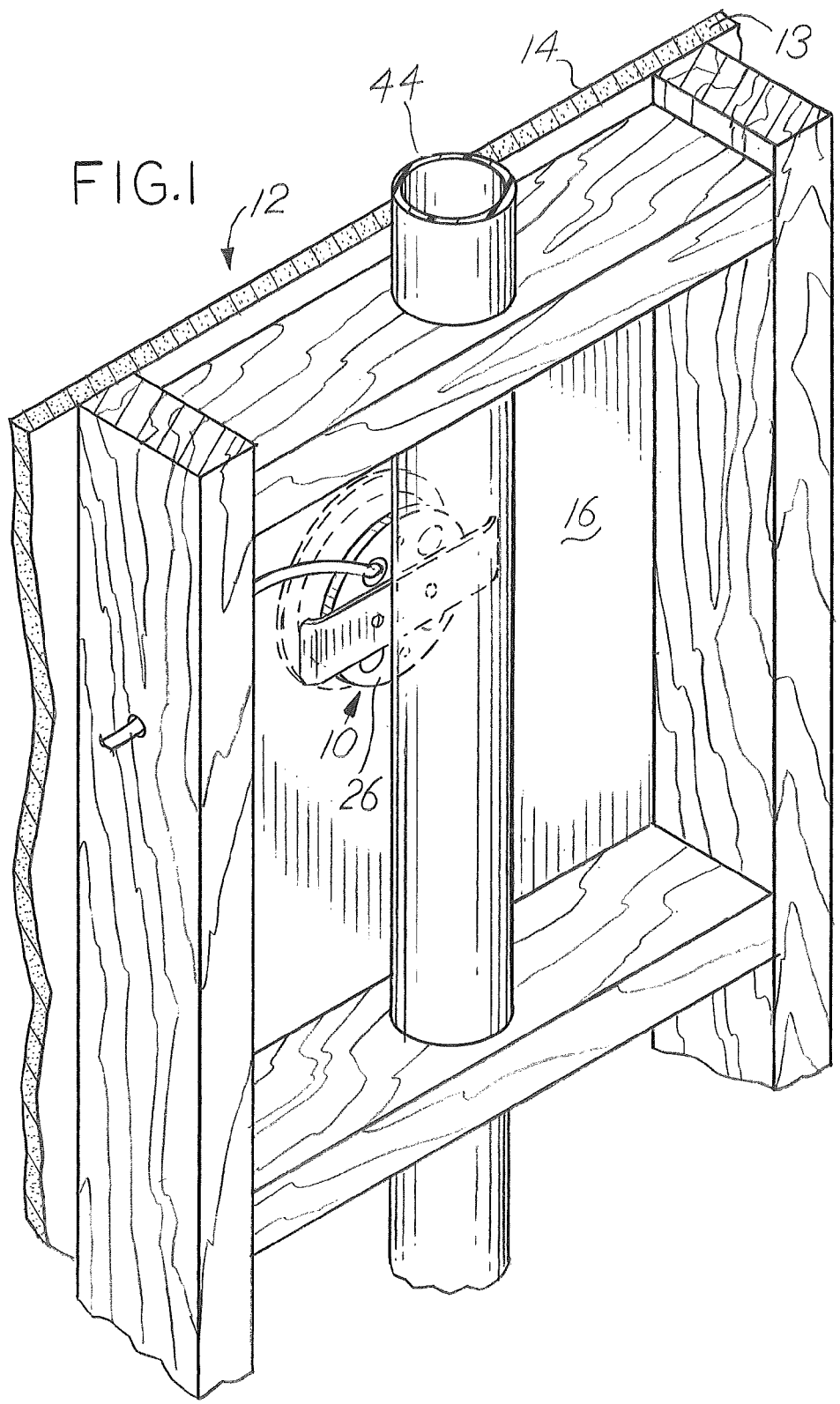
FIG. 1 is a perspective view of the electrical box of this invention installed in a wall as viewed from behind.
Figure 2:
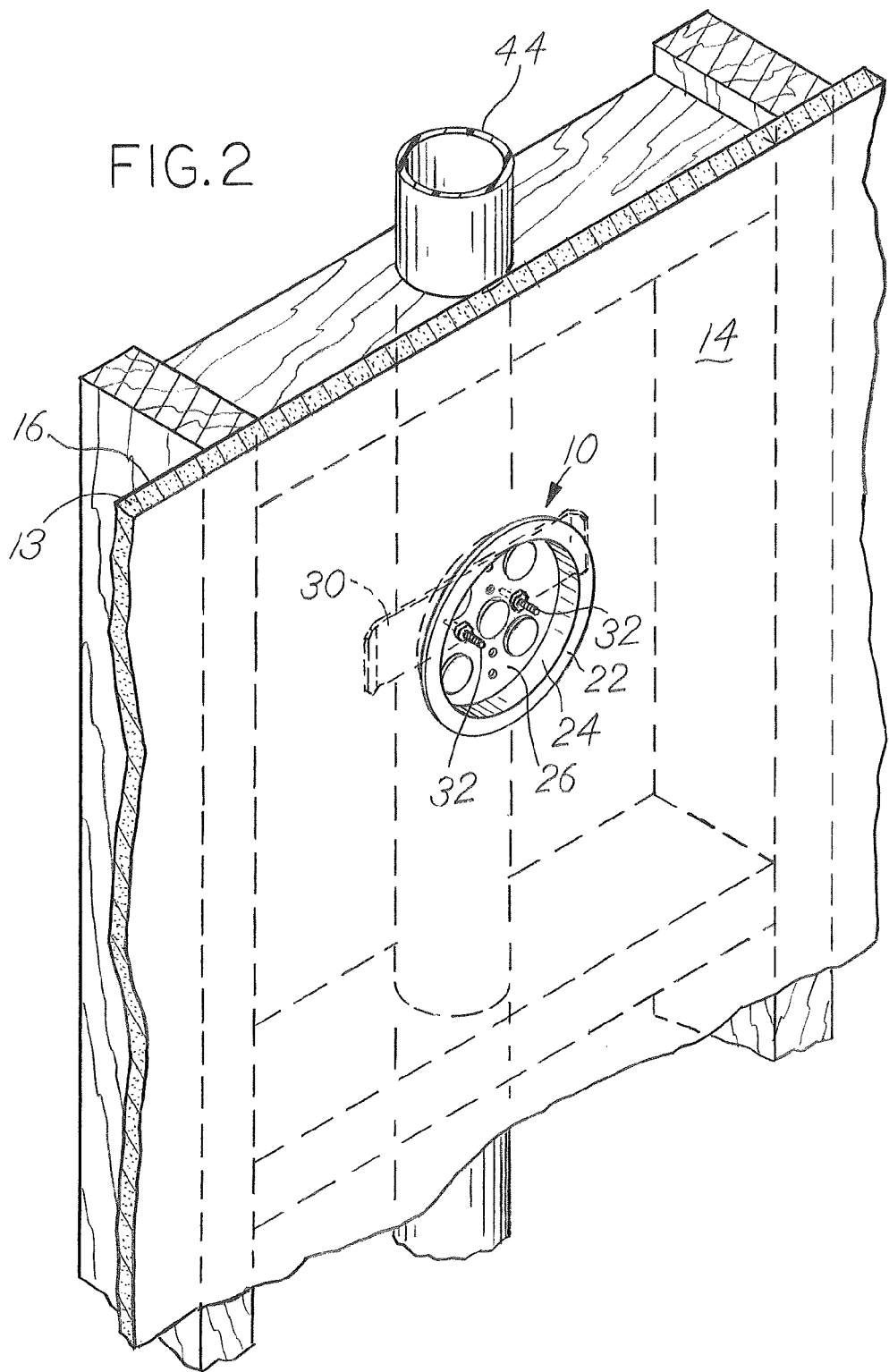
FIG. 2 is a perspective view of the electrical box shown in FIG. 1 from in front of the box, outside the wall.

The electrical box 10 of this invention is particularly suited to being mounted into a wall 12 from outside the wall 12 in situations where an obstruction on the inside of the wall 12 would prohibit protrusions from extending behind the electrical box 10. The wall 12 has wallboard 13 having an outer surface 14 and an inner surface 16. The interior 18 of the wall 12 is considered to be behind the electrical box 10.

The electrical box 10 includes a pan 20 that has a front flange 22 that extends outwardly from a sidewall 24. A back wall 26 spans across the sidewall 24 to form an interior 28. The pan 20 may be made of metal that is stamped and may also be a molded plastic part. The front flange 22 is designed to contact an outer surface 14 of a wall 12 in which the electrical box 10 will be mounted.

Figure 3:
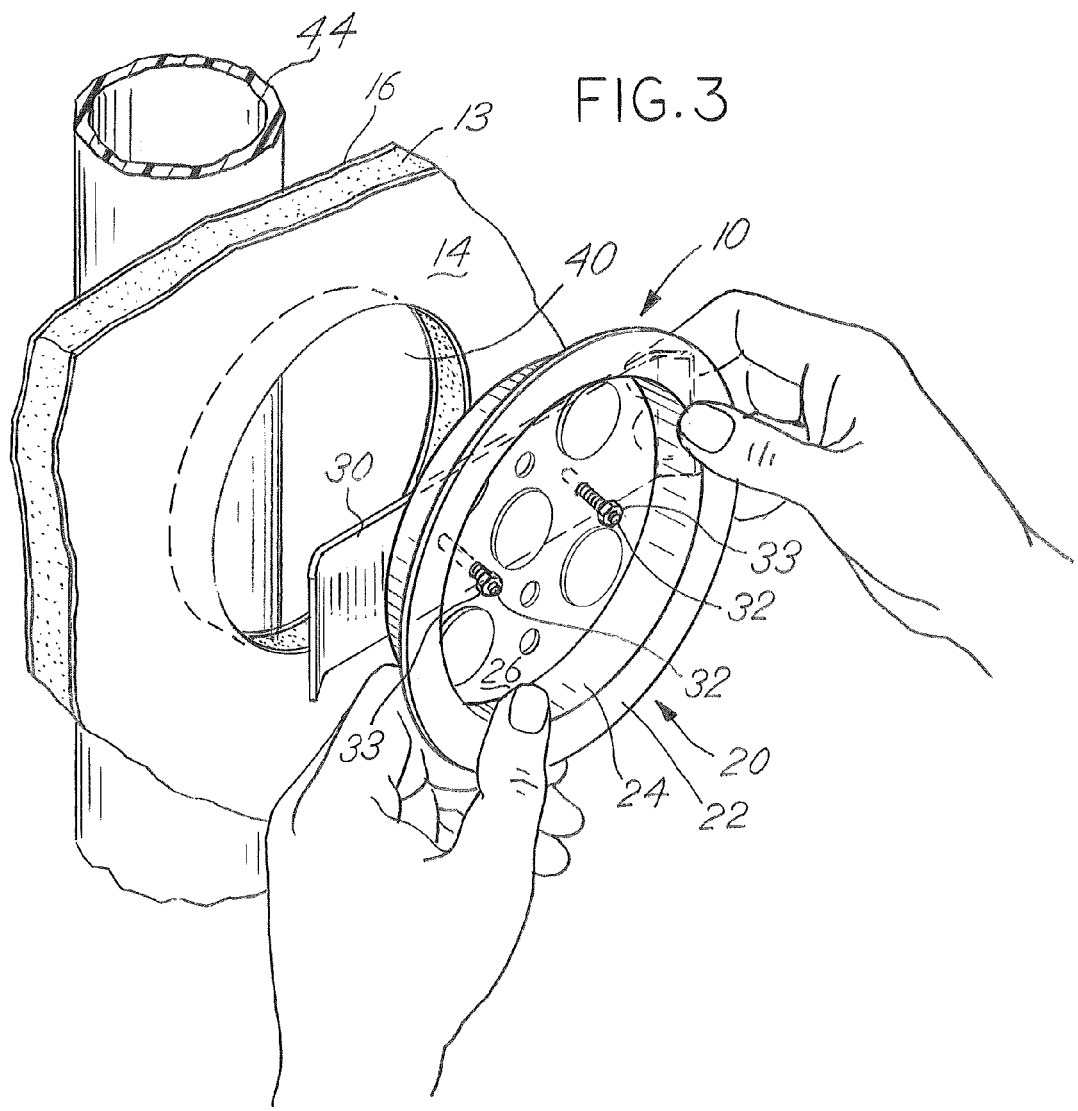
FIG. 3 is a perspective of the electrical box shown in FIGS. 1 and 2 outside of the wall.

A back bracket 30 is positioned opposite the front flange 22 and is held near the back wall 26 with two screws 32. The back bracket is a metal piece that is longer than the width of the exterior of the sidewall 24 of the pan 20. The back bracket 30 may be made as shown in FIG. 3, where the ends 34 of the bracket 30 are bent toward the front flange 22. Another back bracket 30' is a continuous flat piece and its ends 34' that are not bent.

The screws 32 are threaded into the back bracket 30 and tightened into the back bracket 30. The screws 32 remain fixed relative to the back bracket 30 and move with the back bracket 30. Their threaded shafts 36 protrude through the back wall 26 into the interior 28 of the pan 20. The threaded shafts 36 slide freely through holes 37 in the back wall 26. FIG. 3 shows how the screws 32 protrude into the interior 28 of the pan. As such, no threaded portion of the screws 32 extends behind the back bracket 30.

The screws 32 receive nuts 33 on their shafts 36. The back bracket 30, 30' has a first position shown in FIGS. 6, and 7 that is adjacent to the back wall 26 of the pan 20. The back bracket 30, 30' also has a second position spaced farther from the back wall 26 than in the first position and this is shown in FIG. 4. Since the shafts 36 of the screws 32 slide freely through the holes 37, the back bracket 30 is movable between the first and second positions. The lengths of the screws 32 are chosen so that when the nuts 33 are near the ends of the shafts 36, the wallboard 13 will fit between the back wall 26 and back bracket 30 as shown in FIG. 5.

When an electrician installs the electrical box he will first cut a round opening 40 in the wallboard 13 that is the same size or slightly larger than the exterior surface of the sidewall 24 of the pan 20. Cutting the opening 40 is typically done with a standard hole saw. As is frequently the case, the opening 40 reveals a pipe 44 in the wall 12 where the electrical box 10 is to be placed. As seen in FIGS. 4-6, this pipe 44 would obstruct the placement of a standard electrical box. Once the opening 40 is cut, the nuts are backed off the screws so that the back bracket 30 is in its second position spaced away from the back wall 26. The electrical box 10 is then placed as shown in FIG. 5, with the wallboard 13 between the back bracket 30 and the back wall 26. Once the back bracket 30 is behind the wallboard 13, the electrical box is moved over as shown in FIG. 6 so that the wallboard 13 is between the front flange 22 and the back bracket 30. To complete the installation, the nuts 33 are tightened against the back wall 26, which urges the back bracket 30 toward the back wall 26 and clamps the portion of the wallboard 13 that is between the back bracket 30 and front flange 22. This installed position corresponds to the first position of the back bracket 30 relative to the back wail 26, where the back bracket 30 is relatively near the back wall 26. In this position, the ends 34 being bent as shown in FIG. 6 allow the depth of the pan 20 to extend further into the wall than the thickness of the wallboard 13.

The invention is not limited to the details given above, but may be modified within the scope of the following claims.

What is claimed is:

1. A wall mount electrical box comprising:
    a pan having a front flange for contacting an outer wall surface, a periphery sidewall, and a back wall spanning across said sidewall to define an interior, said front flange extending outwardly from said sidewall; and
    a back bracket positioned opposite said front flange and adjacent to said back wall, a fastener fixed relative to said back bracket and having a shaft extending through said back wall movably securing said back bracket to said back wall so that no portion of said shaft extends behind said back bracket, said back bracket movable relative to said pan between a first position adjacent to said back wall and a second position spaced farther from said back wall, said back bracket and said front flange adapted for clamping a portion of said wall located between said front flange and back bracket when said back bracket is in its first position.

2. A wall mount electrical box as claimed in claim 1, wherein said fastener slidingly extends through said back wall and said fastener includes threads on its shaft for receiving a nut, said nut urging said back bracket against said portion of said wall as said nut is tightened against said back wall.

3. A wall mount electrical box as claimed in claim 2, including a plurality of fasteners.

4. A wall mount electrical box as claimed in claim 3, wherein said fasteners are screws having a head, said screws mounted into said back bracket so that only said head extends behind said back bracket.

5. A wall mount electrical box as claimed in claim 3, wherein said fasteners are spaced from said sidewall to permit an end of said back bracket outside of said wall to be inserted into an opening in said wall having substantially same size as an exterior of said sidewall when said wall is located between said back wall and said back bracket.

6. A wall mount electrical box as claimed in claim 3, wherein said fasteners are screws and no part of said shaft extends behind said back bracket.

7. A wall mount electrical box as claimed in claim 2, wherein said back bracket includes ends that are bent toward said front flange.

* * * * *